(12) United States Patent
Mamitsu et al.

(10) Patent No.: US 7,328,900 B2
(45) Date of Patent: Feb. 12, 2008

(54) IMPACT SIMULATOR ACTUATING RESTRAINT BELT USING BELT PATH DISPLACING MEMBER AND GAME APPARATUS INCLUDING THE IMPACT SIMULATOR

(75) Inventors: Hirofumi Mamitsu, Himeji (JP); Tomohisa Tanaka, Miki (JP); Satoru Yoshida, Toyonaka (JP)

(73) Assignee: Konami Corporation, Tokyo (JP)

( * ) Notice: Subject to any disclaimer, the term of this patent is extended or adjusted under 35 U.S.C. 154(b) by 281 days.

(21) Appl. No.: 11/171,922

(22) Filed: Jun. 29, 2005

(65) Prior Publication Data

US 2006/0012118 A1   Jan. 19, 2006

(30) Foreign Application Priority Data

Jul. 16, 2004   (JP)   ............... 2004-209607

(51) Int. Cl.
    *A63F 13/08*   (2006.01)
(52) U.S. Cl. .................... 273/148 B; 463/30
(58) Field of Classification Search ............ 273/148 B; 345/156; 434/59, 62; 463/30, 47
    See application file for complete search history.

(56) References Cited

U.S. PATENT DOCUMENTS

| 3,309,795 | A | * | 3/1967 | Helmore | ............ 434/59 |
|---|---|---|---|---|---|
| 4,597,586 | A | * | 7/1986 | Burghardt et al. | ........ 280/806 |
| 5,921,780 | A | * | 7/1999 | Myers | ............ 434/69 |
| 6,135,450 | A | * | 10/2000 | Huang et al. | ....... 273/148 B |
| 6,793,495 | B2 | * | 9/2004 | Kang | ............ 434/55 |
| 2001/0036868 | A1 | * | 11/2001 | Roy et al. | ........... 472/130 |
| 2006/0012118 | A1 | * | 1/2006 | Mamitsu et al. | ...... 273/148 B |

FOREIGN PATENT DOCUMENTS

| EP | 0 970 730 | 1/2000 |
|---|---|---|
| JP | 8-169299 | 7/1996 |
| JP | 2540372 | 4/1997 |
| JP | 11-105672 | 4/1999 |
| JP | 2000-293093 | 10/2000 |
| WO | 99/17850 | 4/1999 |
| WO | WO-99/24132 | 5/1999 |

* cited by examiner

Primary Examiner—Raleigh W. Chiu
(74) Attorney, Agent, or Firm—Jordan and Hamburg LLP

(57) ABSTRACT

An impact simulation apparatus is provided which allows a player to feel an impact simulation according to an impact image on a monitor screen. This apparatus includes: a seat belt as a body fixing member which fastens the player; an impact simulation giving portion which gives an impact to the player by straining this seat belt and has a winding drum, a belt pressing member, a driving motor, and the like; and a control unit which outputs, to the driving motor, a control signal for giving an impact when a simulated vehicle bumps on a predetermined condition, so that the seat belt can be slackened and strained.

7 Claims, 9 Drawing Sheets

IMPACT SIMULATOR ACTUATING RESTRAINT BELT USING BELT PATH DISPLACING MEMBER AND GAME APPARATUS INCLUDING THE IMPACT SIMULATOR

BACKGROUND OF THE INVENTION

1. Field of the Invention;

The present invention relates to a game-machine impact simulation apparatus which allows a player to feel a predetermined impact simulation according to a game situation, and a game machine provided with this apparatus.

2. Description of the Related Art;

Conventionally, there has been known a game machine for a driving game which is configured so that a player watches an image that is displayed on a monitor screen and performs various pieces of play. This driving-game machine is a game machine for a driving game which gives a situation where a player drives a vehicle virtually. It is configured by: a driver's seat which includes a driving apparatus such as a steering wheel, an accelerator, and further, a brake pedal; and a monitoring apparatus which includes a monitor screen on which a virtual driving road that is visible from this driver's seat is displayed.

The player is supposed to sit down in the driver's seat and perform a driving operation. Specifically, the player appropriately operates the steering wheel, the accelerator, further, the brake pedal or the like, so that the player's vehicle can avoid running into an outside object such as another vehicle, a telegraph pole and a side wall which are displayed on the monitor screen.

In such a conventional driving-game machine, however, while watching an image on a monitor screen, a player simply performs a virtual driving operation. Even if a virtual vehicle of which the player performs the virtual driving operation crashes into an outside object such as another vehicle, a telegraph pole and a side wall which are displayed on the monitor screen, that crash is merely the one which appears with little presence on the screen. Therefore, another such machine has also been known in which if a player's vehicle hits against another vehicle or an outside object on a monitor screen, the player can feel the bump's impact as if the player were really experiencing it. This is realized by giving a deep-sound vibration to a seat on which the player sits, or giving a vibration to a steering wheel.

However, according to such a structure in which a vibration is given to a seat or a steering wheel, in a so-called vehicle-riding game such as a driving game, in general, a player can only feel the vibration as the game. In other words, the player can simply feel a certain level of presence according to the strength of such a vibration. Hence, as a matter of course, there is a limit to staging a virtual impact.

SUMMARY OF INVENTION

In view of the aforementioned disadvantages, it is an object of the present invention to provide a game-machine impact simulation apparatus and a game machine provided with this apparatus which allow a player to feel an impact simulation more effectively and with more presence while playing a game.

A game-machine impact simulation apparatus according to a first aspect of the present invention which allows a player to feel a predetermined impact simulation according to a game situation, comprising: a body fixing member which fixes the body of the player; and an impact generating unit which gives a momentary change in the strength at which the body is fixed by the body fixing member.

According to this configuration, the player who is playing a game with kept fixed by the body fixing member receives forces via the body fixing member from the impact generating unit. This force is the one which gives a momentary change in the player's fixing strength according to the game's situation. Thereby, the player can feel the impact which corresponds to a game situation.

These and other objects, features and advantages of the present invention will become more apparent upon reading of the following detailed description along with the accompanied drawings.

BRIEF DESCRIPTION OF THE DRAWINGS

FIG. 6A shows a state in which a winding drum is set in an initial angular position. FIG. 6B shows a state in which the winding drum is set in a middle angular position. FIG. 6C shows a state in which the winding drum is rotated clockwise by substantially 45 degrees around the center of the drum from the middle angular position so that a bridging rod of a projecting arm is in contact with a seat belt. FIG. 6D shows a state in which the winding drum is set in a belt pulling angular position so that the seat belt is pulled back.

FIG. 8A shows a state in which the seat belt is attached to a player in an ordinary-stretch state by the force of a spiral spring of a belt winding-up unit. FIG. 8B shows a state in which the seat belt is pulled out of the belt winding-up unit against the force of the spiral spring by the clockwise drive of a driving motor. FIG. 8C shows a state in which the seat belt is repeatedly strained and eased by a forward and reverse drive of the driving motor.

FIG. 9A shows a state in which the seat belt is attached to a player P in an ordinary-stretch state by the force of a spiral spring of a belt winding-up unit. FIG. 9B shows a state in which the seat belt is pulled out of the belt winding-up unit against the force of the spiral spring by the clockwise drive of a driving motor. FIG. 9C shows a state in which the seat belt is strained by the drive of the driving motor.

DETAILED DESCRIPTION OF INVENTION

Hereinafter, a driving-game machine will be described as an example of a game machine provided with an impact simulation apparatus according to the present invention.

Figure 1:
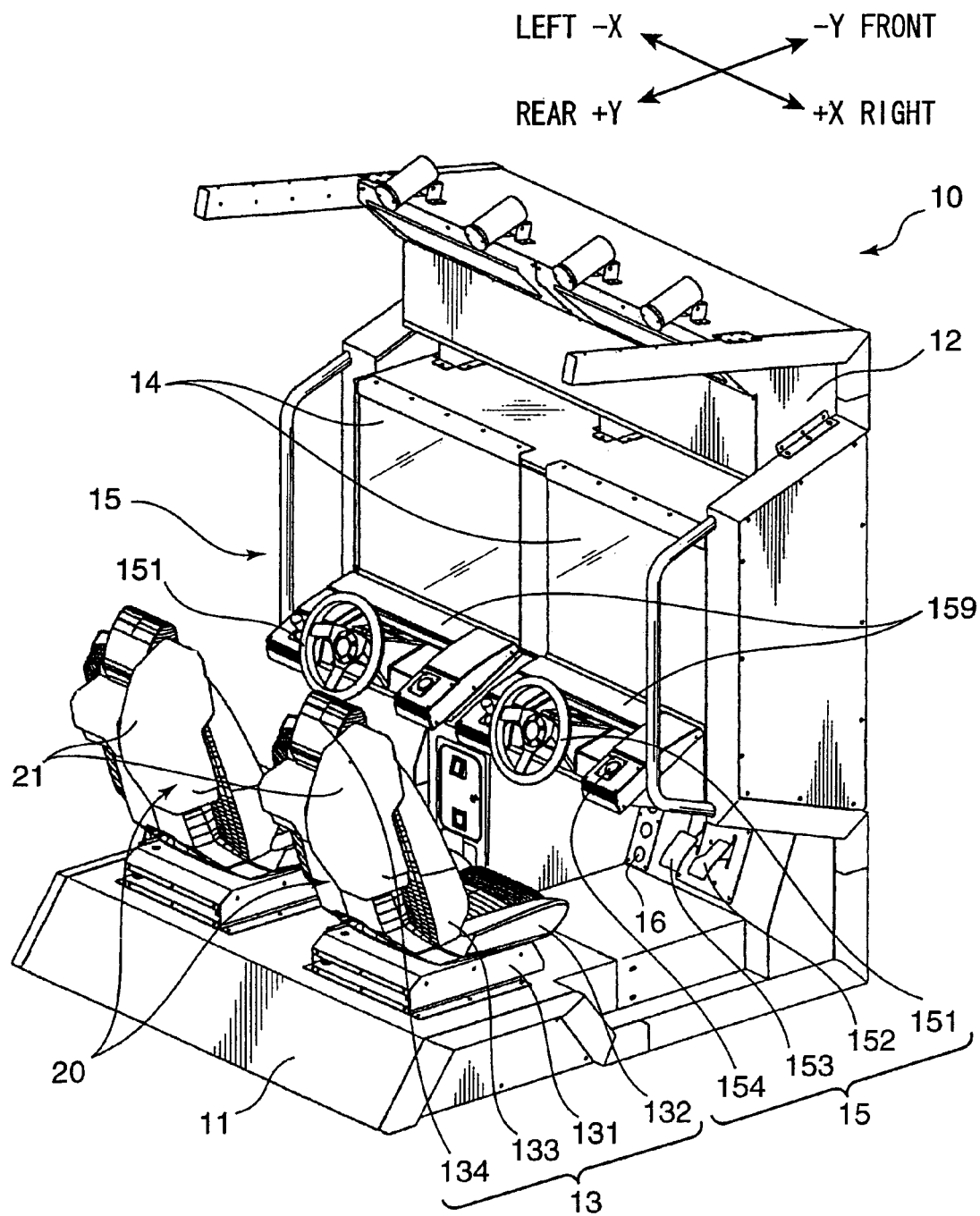
FIG. 1 is a perspective view of a driving-game machine according to an embodiment of the present invention.
Figure 2:
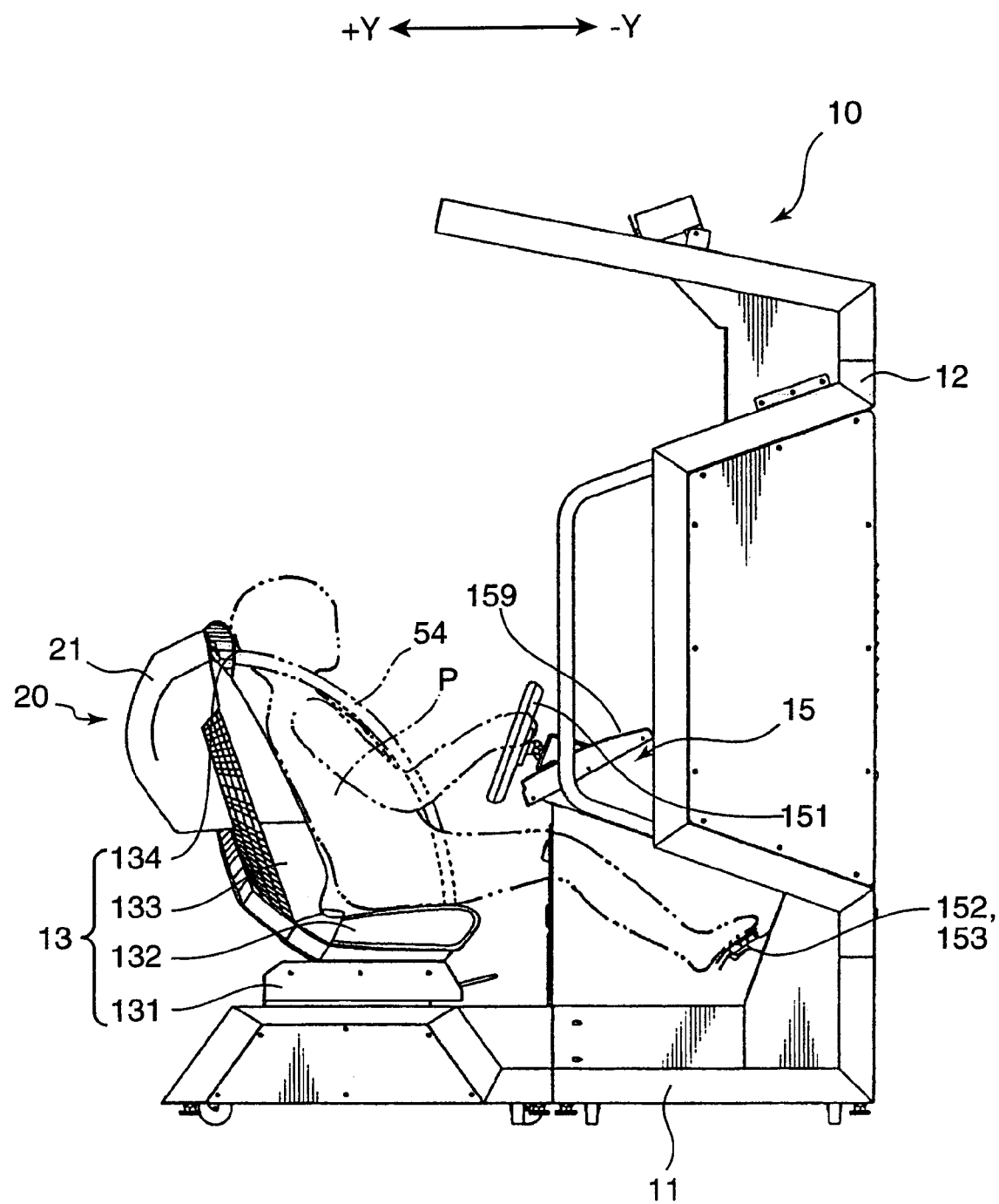
FIG. 2 is a side view of the driving-game machine shown in FIG. 1.

FIG. 1 is a perspective view of a driving-game machine according to an embodiment of the present invention. FIG. 2 is its side view. Herein, in FIG. 1 and FIG. 2, the directions of X-X indicate the width directions, and the directions of Y-Y indicate the front-and-rear directions. More specifically, the direction of −X represents the left-hand direction; the direction of +X, the right-hand direction; the direction of −Y, the front direction; and the direction of +Y, the rear direction.

As shown in FIG. 1 and FIG. 2, a driving-game machine 10 is used to allow a player P to be a driver and drive a vehicle virtually so that the player P enjoys a game. It is basically configured by: a base 11 which is fixed on a floor and has a rectangular shape in plan view; a front frame 12 which is disposed upright in the front part of this base 11 and has substantially the same width in the right-and-left directions as that of the base 11; a pair of right and left seat units (i.e., the body fixing portions) 13 which are each disposed in a rear position on the base 11; a pair of monitors 14 which are each disposed in the width directions so as to face each seat unit 13, at substantially the middle position in the vertical direction of the front frame 12; a driving operation portion 15 which is disposed below each monitor 14 in the front frame 12; and an impact simulation apparatus 20 according to the present invention which is attached to the seat unit 13.

The seat unit 13 includes: a seat support 131 which is fixed on the base 11; a seat bottom 132 which the player P sits down on and is attached to this seat support 131 so that its position can be adjusted in the front-and-rear directions; a seat back 133 (to lean back on) which is disposed upright from the rear-edge part of this seat bottom 132; and a headrest 134 which is attached to the top part of this seat back 133. The player P sits down on the seat bottom 132 and leans back against the seat back 133, so that the player P faces the monitor 14 in front. Then, the player P views a game image which is displayed in this monitor 14. It shows the player P's front view through the vehicle's windshield while driving it. Simultaneously, the player P operates various operation members of the driving operation portion 15 to play a game.

The player P who is seated in the seat unit 13 brings a seat belt (i.e., the long object member (or the body fixing member); described later) 54 which is pulled out of the upper-right side of the seat back 133, around the chest and the belly from the right shoulder like a Buddhist priest's stole. Then, the player P hooks its front end on the front-left side of the seat bottom 132. Thereby, the player P's upper body is pressed against the seat back 133 by this seat belt 54, so that the player P is securely seated.

The driving operation portion 15 includes: a steering wheel 151 which protrudes toward the player P from an operation panel 159 right below the monitor 14; an accelerator pedal 152 which protrudes toward the player P's feet from the front frame 12 below the operation panel 159; a brake pedal 153 which is disposed leftward from this accelerator pedal 152; and a start button 154 for inputting a game start.

If the player P who is seated in the seat unit 13 presses down the start button 154, a game begins. First, in the monitor 14, for example, a still picture is outputted which shows the player P's front view through the vehicle's windshield. While watching the monitor 14, in the same way as the case where the player P is really driving the vehicle, the player P steps on the accelerator pedal 152, turns the steering wheel 151, and if necessary, steps on the brake pedal 153. In line with these operations, the monitor 14's picture changes to a picture in the running direction. This allows the player P to feel as if the player P were driving the vehicle.

In addition, a speaker 16 is disposed on the left of the brake pedal 153. This speaker 16 outputs various sound effects which are necessary as a game makes headway. This makes the game full of more presence.

As the driving game, there can be mentioned, for example: a time race in which vehicles compete to finish running a predetermined driving course within the shortest period of time; a competition race in which the order of arrival of vehicles is decided; a point-subtraction game in which a vehicle simply drives on the streets in conformity with the traffic regulations and has points taken off for violating them; or the like.

In this embodiment, the impact simulation apparatus 20 is placed in the seat back 133. If the vehicle the player P is virtually driving bumps, in the monitor 14, into an outside object (or an obstacle) such as another vehicle, a telegraph pole and a side wall, then the impact simulation apparatus 20 works so that the player P can feel an impact simulation. The impact simulation apparatus 20 which is attached to the seat back 133 is covered with a cover body 21. This helps make the seat unit 13's appearance better.

Figure 3:
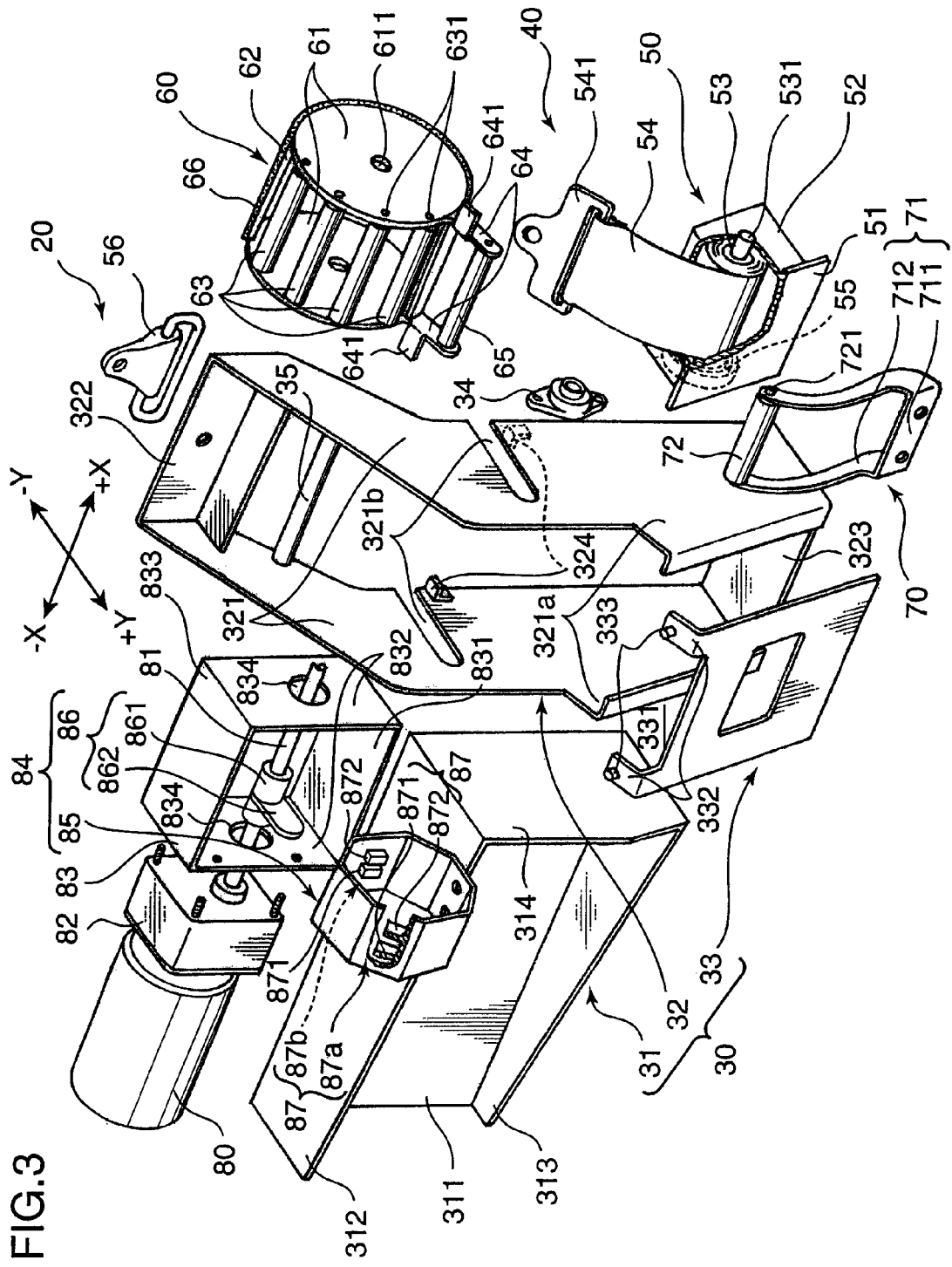
FIG. 3 is a perspective exploded view of an impact simulation apparatus according to a first embodiment of the present invention.
Figure 4:
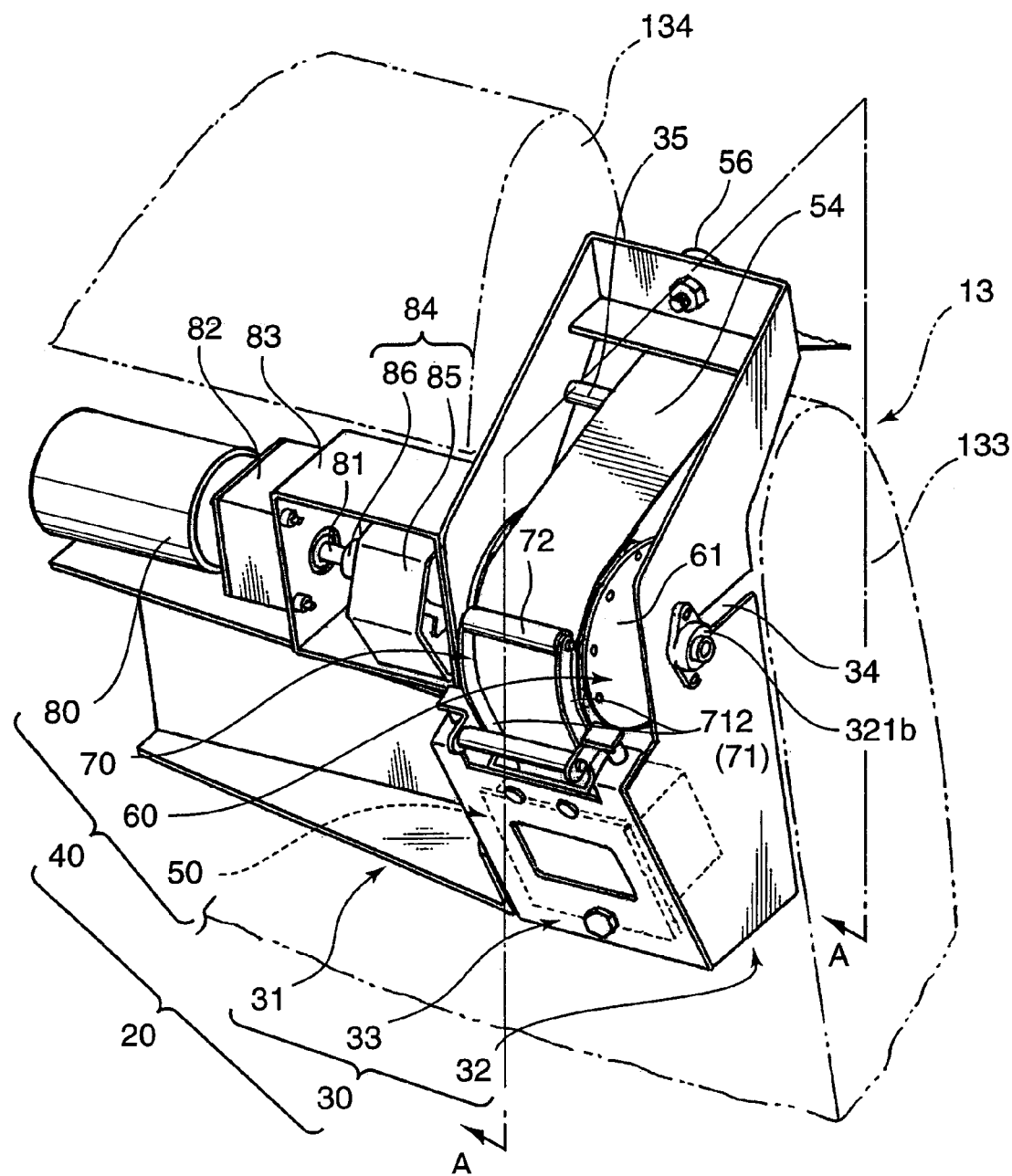
FIG. 4 is a perspective assembled view of the impact simulation apparatus shown in FIG. 3.
Figure 5:
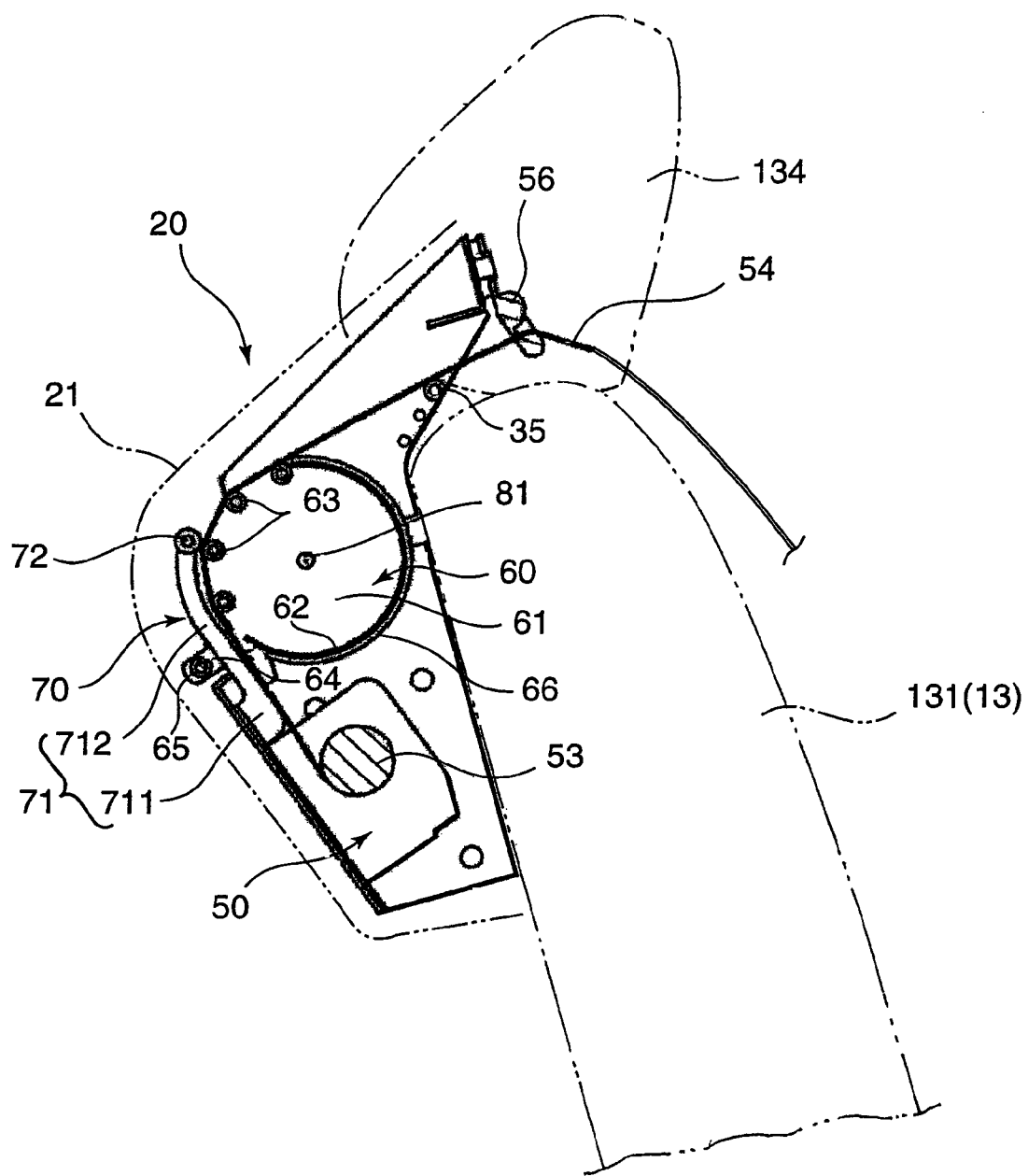
FIG. 5 is a sectional view of the impact simulation apparatus, seen along an A-A line in FIG. 4.

FIG. 3 is a perspective exploded view of the impact simulation apparatus 20 which is a component element of an impact simulation apparatus according to a first embodiment of the present invention. FIG. 4 is its perspective assembled view. FIG. 5 is its sectional view, seen along an A-A line in FIG. 4. In FIG. 3 to FIG. 5, the directional indications of X and Y are the same as those of FIG. 1. As shown in these figures, the impact simulation apparatus 20 is configured by a frame 30 which is fixed to the upper-right part of the seat back 133, and an impact giving mechanism 40 which is attached to this frame 30.

The frame 30 is formed by: a laterally-long frame 31 which has a U-shaped section and is fixed right below the headrest 134 of the back-surface side (or rear-surface side) of the seat back 133; a longitudinally-long frame 32 which is fixed by means of a bolt or welding to the right-end part of this laterally-long frame 31; and a cover frame 33 which closes the lower part of the opening on the rear-surface side of this longitudinally-long frame 32.

The laterally-long frame 31 is made up of: a flat plate 311 which is fixed closely to the rear surface of the seat back 133; an upper plate 312 which protrudes rearward from the upper-edge part of this flat plate 311; a lower plate 313 which protrudes rearward from the lower-edge part thereof; and a right plate 314 which protrudes rearward from the right-edge part thereof. The right plate 314 is fixed to substantially the lower-half part of the longitudinally-long frame 32. Thereby, the laterally-long frame 31 is united with the longitudinally-long frame 32.

The longitudinally-long frame 32 is made up of: a pair of right and left side plates 321; an upper bridging plate 322 which bridges the upper-edge parts of the pair of side plates 321; and a lower bridging plate 323 which bridges the lower-edge parts thereof. In each side plate 321, substantially its upper half inclines forward as it extends upward, and its upper-edge part is formed substantially vertically. Thereby, the upper bridging plate 322 which bridges the upper-edge parts of the pair of side plates is substantially perpendicular.

In the lower half of the side plate 321, a protruding portion 321a which protrudes rearward is formed slightly below the middle of the side plate 321. Thereby, in the side plate 321, its lower part is wider in the front-and-rear directions than the other part. In the above described laterally-long frame 31, the right plate 314 is fixed in the position where the protruding portion 321*a* of the left side plate 321 is formed in the longitudinally-long frame 32. Thereby, the laterally-long frame 31 is united with the longitudinally-long frame 32, so that the frame 30 is formed. The frame 30 is fixed to the seat back 133 by holding the flat plate 311 of the laterally-long frame 31, by means of a bolt, to the rear surface of the seat back 133.

In a state where a belt winding-up unit (i.e., the winding-up unit: described later) 50 is attached, the above described cover frame 33 closes the opening of the rear-lower part of the longitudinally-long frame 32. It has a rectangular shape. In the upper-edge part of the cover frame 33, its middle part in the width directions is cut off downward to form a cut-off concave portion 331. In addition, from both outsides of this cut-off portion 331, a pair of hooked strips 332 in the width directions is bent forward so as to protrude. In a state where the rear opening of the longitudinally-long frame 32 is kept closed with the cover frame 33, these hooked strips 332 hooked on their corresponding protruding portions 321*a* of the side plates 321 of the longitudinally-long frame 32.

The above described impact giving mechanism 40 is attached to the frame 30 configured in this way. The impact giving mechanism 40 is configured by: the belt winding-up unit 50 which winds up the seat belt 54 for fastening the player P on the seat unit 13 in the winding-up direction by the force of the bias member; a winding drum 60 onto which the seat belt 54 that is pulled out of this belt winding-up unit 50 is wound; a belt pressing member 70 which presses the seat belt 54 that is pulled out of this belt winding-up unit 50 onto the circumferential surface of the winding drum 60; and a driving motor (i.e., the driving source) 80 which rotates this winding drum 60 around the drum center.

Herein, in this embodiment, the belt pressing member 70, and a free roller 63 and a sheet member 66 (described later), configures the mechanical unit which moves the seat belt 54 together with the winding drum 60's rotation and lets out and winds up the seat belt 54.

The above described belt winding-up unit 50 includes: a flat attachment plate 51 for attaching the belt winding-up unit 50 to the cover frame 33; a rectangular-parallellepiped casing 52 which is united with this attachment plate 51 on its front-surface side; a reel 53 which is supported on a support shaft 531 that extends in the right-and-left directions inside of this casing 52, so that it can freely rotate around the support shaft 531; the seat belt 54 which is wound onto this reel 53; and a spiral spring (i.e., the bias member) 55 which gives force to the reel 53 in the direction in which the seat belt 54 is wound up. In the top surface of the casing 52, a belt insertion slit 521 is formed through which the seat belt 54 is inserted. Thereby, the front-end side of the seat belt 54 which is wound up on the reel 53 is led out through this belt insertion slit 521.

The reel 53 is forced counterclockwise in FIG. 3 by the spiral spring 55. Thereby, the reel 53 is rotated by the counterclockwise force around the support shaft 531, so that the seat belt 54 is always pulled into the casing 52. To the seat belt 54, a hooked metal fitting 541 is attached at its front end. This hooked metal fitting 541 is attached to a hooked member (not shown) which is provided on the front-left side surface of the seat bottom 13 (see FIG. 2). Thereby, the seat belt 54 is kept pulled out of the reel 53.

In addition, to the upper bridging plate 322 of the longitudinally-long frame 32, a guidance fitting 56 through which the seat belt 54 is inserted and guided is attached on its front-surface side by means of a screw. If the seat belt 54 is inserted through this guidance fitting 56, the upper end of the seat belt 54 is designed to be positioned with keeping the player P fastened.

The above described winding drum 60 is used to wind the seat belt 54 which is pulled out of the belt winding-up unit 50. It includes: a pair of circular drum plates 61 in the width directions; an arc-shaped bridging plate 62 which bridges the peripheral parts within a predetermined central angle of, for example, approximately 270 degrees in this pair of drum plates 61; a plurality of free rollers 63 which bridge the peripheral parts of the drum plates 61 at regular pitches in the circumferential directions in the part where the arc-shaped bridging plate 62 is not provided between the pair of drum plates 61; a pair of protruding arms 64 in the width directions which protrudes outward in the radial direction from the position that corresponds to an edge on the counterclockwise side of the arc-shaped bridging plate 62 in the drum plates 61; a bridging rod 65 which bridges the front-end parts of the pair of protruding arm 64; and the sheet member 66 which is layered over the peripheral surface of the arc-shaped bridging plate 62, and that has a predetermined frictional coefficient, and for example, is made of rubber. The protruding arms 64 and a bridging rod 65 from the arm according to the present invention.

Herein, the free rollers 63 are provided so that the seat belt 54 which is wound on the winding drum 60 can be freely let out or rewound from its contact position. Hence, it is not limited to this structure, as long as it has the same function. For example, a structure with a bearing may also be used. Hereinafter, an example will be described in which free rollers are used.

In this embodiment, the winding unit according to the present invention is formed by: the peripheral surface of the winding drum 60 provided with the plurality of free rollers 63; the sheet member 66 which brings the seat belt 54 as the winding drum 60 rotates; and the bridging rod 65 which bridges the pair of protruding arms 64 so as to stride the seat belt 54 which is wound on the peripheral surface of the up-and-down moving mechanism 60. In addition, the arm according to the present invention is configured by the pair of protruding arms 64 and the bridging rod 65 which bridges these protruding arms 64 according to this embodiment. However, the present invention is not limited to this configuration in which the arm is formed by these protruding arms 64 and bridging rod 65. For example, an L-shaped hooked protrusion (i.e., the arm) from one drum plate 61 may also be provided, so that the seat belt 54 can stride the bent part on the tip side of this protrusion.

The winding drum 60 is attached to substantially the middle position in the vertical direction between the pair of side plates 321 of the longitudinally-long frame 32, so that a central hole 611 which is made in the central position of the pair of drum plates 61 is concentric with a drive shaft 81 of the driving motor 80, and so that it is fitted from outside. In order to attach the winding drum 60 between the pair of side plates 321 of the longitudinally-long frame 32, each side plate 321 has a notch 321*b* which is formed by cutting into it rearward from its front edge in substantially the middle position in the vertical direction. Into these notches 321*b*, the drive shaft 81 is fitted, so that the winding drum 60 is attached between the side plates 321.

With the drive shaft 81 kept fitted into the pair of notches 321*b*, a bearing metal fitting 34 is fitted from outside on the tip part of the drive shaft 81. Then, this bearing metal fitting 34 is fixed by means of a screw on the right-hand side plate 321. Thereby, the winding drum 60 is attached to the pair of side plates 321 between them.

The above described driving motor 80, belt winding-up unit 50, winding drum 60 and belt pressing member 70 configure the impact generating unit which gives an impact to the player P according to the present invention.

The above described free roller 63 is supported on each of several roller shafts 631 which bridge the pair of drum plates 61, so that it can be freely rotated around the roller shaft 631. Thereby, the seat belt 54 is wound on the plurality of free rollers 63, but the seat belt 54 is led into the rotation of the free rollers 63. This prevents the seat belt 54 from being pulled out of the casing 52.

In each of the above described pair of protruding arms 64, a protruding strip 641 is provided which protrudes from its base-end position, in the direction apart from each other. On the other hand, in each hooked strip 332 of the above described cover frame 33, a rear stopper 333 is provided which corresponds to the protruding strip 641. The protruding strip 641 comes into contact with the rear stopper 333, and then, stops there. Thereby, the winding drum 60 can be hindered from rotating beyond here couterclockwise around the drive shaft 81.

In addition, in the above described longitudinally-long frame 32, a pair of front stoppers 324 are provided which protrude in the directions opposite to each other, a little below the notches 321b in the front positions of the pair of side plates 321. Thereby, the pair of protruding strips 641 come into contact with the front stoppers 324, and then, stop there, so that the winding drum 60 can be hindered from rotating clockwise beyond here.

The above described belt pressing member 70 is used to press, onto the peripheral surface of the winding drum 60, the seat belt 54 which is pulled out of the casing 52 and passes between the peripheral surface of the winding drum 60 and the bridging rod 65. It is formed by a forked U-shaped member 71, and a pressing roller 72 which is attached to this U-shaped member 71. The pressing roller 72 has substantially the same length as the external length between the pair of drum plates 61.

The U-shaped member 71 is made up of: a stopper plate 711 which is fixed by means of a screw or the like to the upper position on the front-surface side of the cover frame 33, and that is long in the right-and-left directions; and a pair of roller supporting rods 712, which are shaped like an arc along the peripheral surface of the winding drum 60 from the right and left trunk parts of the stopper plate 711, and are long in the vertical direction.

The pressing roller 72 is supported on a roller supporting shaft 721 which bridges the front-end parts of the pair of rollers supporting rods 712, so that it can be freely rotated. In addition, in a state where the cover frame 33 on which the stopper plate 711 is fixed is attached to the longitudinally-long frame 32, and the pressing roller 72 is in contact with the peripheral surface of the winding drum 60, the roller supporting rods 712 are designed to undergo a slight elastic deformation. This elastic force causes the pressing roller 72 to press the peripheral surface of the winding drum 60.

The seat belt 4 is designed to pass between the pressing roller 72 of the belt pressing member 70 and the peripheral surface of the winding drum 60. Therefore, the seat belt 54, which is pulled out of the casing 52, passes between the pressing roller 72 and the peripheral surface of the winding drum 60, so that it is kept pressed onto the peripheral surface of the winding drum 60 by the pressing roller 72.

The above described sheet member 66 is used, by its frictional force, to have the seat belt 54 move with the winding drum 60 in rotational motion. It is layered, for example, via an adhesive, over the whole exterior surface of the arc-shaped bridging plate 62. These sheet member 66 and pressing roller 72 help have the seat belt 54 make the following motion. First, the winding drum 60 is set to a middle angular position P1 (see FIG. 6B: described later). Note that up to this angular position P1 (as first position) from the initial position P0, the relative movement of the seat belt 54 with respect to circumferential movement of the drum 60 is allowed. Thereafter, the winding drum 60 rotates clockwise around its drum center. This rotation leads the seat belt 54 to be pulled out of the belt winding-up unit 50.

Herein, The positional relation between the above described pressing roller 72, seat belt 54, free roller 63 and sheet member 66 will be described in further detail. If the winding drum 60 rotates, then the sheet member 66 presses, because of its own thickness, the seat belt 54 from inside toward the pressing roller 72. This is the case in which the pressing roller 72 presses the seat belt 54 strongly. In other words, in a state where the free roller 63 is on the inside from the seat belt 54, the front end of the pressing roller 72 is designed to be in light contact with the seat belt 54, or away from it by the distance shorter than the thickness of the sheet member 66. Then, when the winding drum 60 rotates and the sheet member 66 is located on the inside from the seat belt 54, because of the thickness of the sheet member 66 itself, the pressing roller 72 presses the seat belt 54 strongly. Thereby, it is pulled out of the belt winding-up unit 50.

The above described driving motor 80 is used to rotate the winding drum 60 in the forward-reverse directions around its drum center. The driving motor 80 is provided with: the drive shaft 81 which is rotated by its drive: and a decelerating mechanism 82 which is disposed between this drive shaft 81 and the driving motor 80. This decelerating mechanism 82 helps make the drive shaft 81's output torque adequately great. Onto this drive shaft 81, the central hole 611 of the winding drum 60 is fitted from outside so that it is stopped from rotating. Thereby, the winding drum 60 is designed to be united and rotated with the drive shaft 81.

This driving motor 80 is fixed via a motor supporting frame-body 83 to the frame 30. The motor supporting frame-body 83 has a rectangular-parallelepiped shape. It is made up of: a bottom plate 831; a pair of right and left side plates 832 in the width directions which is placed upright from the right and left edges of this bottom plate 831; and a top plate 833 which bridges this pair of side plates 832. It is opened to pass through in the front-and-rear directions. In the motor supporting frame-body 83, the bottom plate 831 is fixed by means of a bolt on the upper plate 312 of the laterally-long frame 31, and the right side plate 832 is fixed on the left-hand side plate 321 of the longitudinally-long frame 32. Thereby, it is attached in such a stable state to the frame 30.

In addition, in each of the pair of side plates 832 of the motor supporting frame-body 83, a through hole 834 is formed into which the drive shaft 81 is inserted so as to move freely. The drive shaft 81 is passed through these through holes 834, the notches 321b of the longitudinally-long frame 32 and the central hole 611 of the winding drum 60. In this state, the decelerating mechanism 82 is fixed by means of a bolt or the like to the left-hand side plate 832 of the motor supporting frame-body 83. Thereby, the driving motor 80 is attached to the frame 30, via the motor supporting frame-body 83.

In this embodiment, an angle-detecting structure 84 which detects the rotational angle of the drive shaft 81 is provided inside of the motor supporting frame-body 83. This angle-detecting structure 84 is made up of: a pillar member 85 whose end surface has, for example, an octagonal shape; a detected member 86 which is fitted from outside on the drive shaft 81 inside of this pillar member 85; and optical sensors 87 which are disposed in positions apart from each other by a predetermined angle in the circumferential directions on the interior surface of this pillar member 85. In the optical sensor 87, a light-emitting device 871 and a light-receiving device 872 are disposed opposite to each other in the width directions (i.e., in the right-and-left directions).

The detected member 86 is made up of: a pipe body 861 which is fitted from outside on the drive shaft 81; and a detection protruding-strip 862 which protrudes outward in the radius directions from the peripheral surface of this pipe body 861. The optical sensor 87 is attached so that the space between the light-emitting device 871 and the light-receiving device 872 is located on the rotational locus of the detection protruding-strip 862. When the light which is emitted from the light-emitting device 871 is shielded with the detection protruding-strip 862, the light-receiving device 872 cannot receive the light. Thereby, the rotational angle of the drive shaft 81, or the rotational angle of the winding drum 60 can be detected.

The optical sensor 87 is provided as a first photo-sensor 87a and a second photo-sensor 87b which are placed clockwise in FIG. 3 in positions apart from each other by a predetermined angle in the circumferential directions of the pillar member 85. The first photo-sensor 87a detects whether or not the winding drum 60 is in an initial angular position P0. The second photo-sensor lower 87b detects whether or not the winding drum 60 is in a belt pulling-back angular position P3.

Figures 6A, 6B, 6C, 6D:
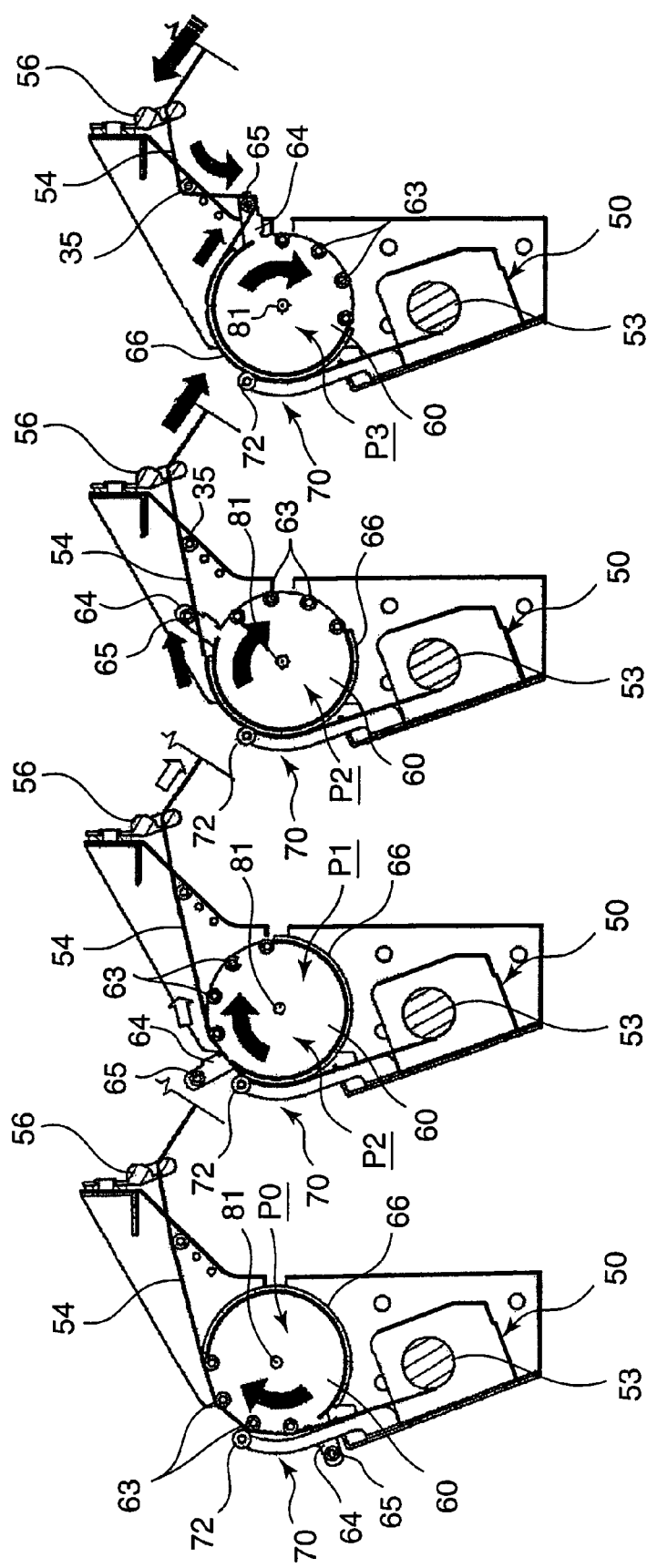
FIGS. 6A to 6D are each a side view of the impact simulation apparatus, showing its operation.

In this embodiment, as shown in FIG. 6A, the initial angular position P0 is an angular position in which the protruding arm 64 extends rearward (or rightward in FIG. 6) so that its tip lies in a slightly lower position, and the seat belt 54 is wound on the four free rollers 63. As shown in FIG. 6B, the middle angular position P1 is an angular position in which the winding drum 60 rotates by substantially 90 degrees clockwise from the initial angular position P0, and thereby, the seat belt 54 comes off the free roller 63 and begins to come into contact with the sheet member 66. As shown in FIG. 6D, the belt pulling-back angular position P3 is an angular position in which the winding drum 60 rotates further by a predetermined angle (e.g., a slightly greater angle than 90 degrees in the example shown in FIG. 6D) from the middle angular position P1, and thereby, the bridging rod 65 winds the seat belt 54 onto the peripheral surface of the winding drum 60 so that its part which is attached to the player P is pulled back.

The initial angular position P0 of the winding drum 60 is detected when the detection protruding-strip 862 comes between the light-emitting device 871 and the light-receiving device 872 of the first photo-sensor 87a. On the other hand, the belt pulling-back angular position P3 is detected when the detection protruding-strip 862 comes between the light-emitting device 871 and the light-receiving device 872 of the second photo-sensor lower 87b.

Hereinafter, an operation of the impact simulation apparatus 20 according to the present invention will be described based upon FIG. 6, and if necessary, with reference to FIG. 1 to FIG. 5, FIGS. 6A to 6D are each a side view of the impact simulation apparatus 20, showing its operation. FIG. 6A shows a state in which the protruding arm 64 of the winding drum 60 is set in the initial angular position P0. FIG. 6B shows a state in which the protruding arm 64 of the winding drum 60 is in the middle angular position P1. FIG. 6C shows a state in which the protruding arm 64 of the winding drum 60 is set in the angular position P2 where the bridging rod 65 of the protruding arm 64 of the winding drum 60 begins to be in contact with the seat belt 54. FIG. 6C shows a state in which the protruding arm 64 of the winding drum 60 is in the belt pulling-back angular position P3 so that the seat belt 54 is pulled back from the position which is attached to the player P.

First, in the state in which the protruding arm 64 of the winding drum 60 is set in the initial angular position P0 shown in FIG. 6A, the seat belt 54 which is pulled out of the belt winding-up unit 50 and is wound onto the winding drum 60 is in contact with the four free rollers 63 of the winding drum 60. In this state, if the player P who is seated in the seat unit 13 changes the posture or adjusts the state in which the seat belt 54 is strained, then a force is applied to the seat belt 54 in the direction where it is pulled out. Thereby, the seat belt 54 is led by the rotation of the free rollers 63 and is smoothly pulled out of the belt winding-up unit 50. On the other hand, if the force applied to the seat belt 54 in the direction where it is pulled out is removed, then by the force of the spiral spring 55 (see FIG. 3) inside of the belt winding-up unit 50, the seat belt 54 is smoothly rewound into the belt winding-up unit 50.

Therefore, in the state in which the protruding arm 64 of the winding drum 60 is set in the initial angular position P0, the player P who is seated in the seat unit 13 is kept in a state in which the player P's chest is pressed against the seat back 133 with the seat belt 54 by the force of the spiral spring 55 (i.e., a state in which there is no slack in the seat belt 54).

In addition, as described later, while a driving game is in execution, if the driving motor 80 (see FIG. 3 and FIG. 4) is driven, and thereby, the drive shaft 81 rotates clockwise (in the figures) around its shaft center, then this rotation is transmitted to the winding drum 60 which is united with the drive shaft 81. Thereby, the winding drum 60 rotates clockwise (shown by a black arrow in FIG. 6) around the drive shaft 81. However, before the protruding arm 64 of the winding drum 60 reaches the middle angular position P1 (see FIG. 6B), the seat belt 54 is not held between the pressing roller 72 and the sheet member 66. Thus, it rubs and moves on the peripheral surface of the winding drum 60 with the help of the rotation of the free rollers 63, so that it continues being pulled out.

Sequentially, if the protruding arm 64 of the winding drum 60 reaches the middle angular position P1, the seat belt 54 is held between the pressing roller 72 of the belt pressing member 70 and the sheet member 66 of the winding drum 60. Then, the frictional force of the sheet member 66 allows it to rotate together with the winding drum 60. Thereby, as shown by a white arrow in FIG. 6B, against the force of the spiral spring 55, it is pulled out of the reel 53 of the belt winding-up unit 50. Therefore, in the seat belt 54, its part toward the position in which the player P is attached from the place which is held between the sheet member 66 and the pressing roller 72 is kept, so to speak, slightly bent.

This slack (i.e., eased strain) in the seat belt 54 allows the player P to feel in a moment a state where the player P is given a forward acceleration by the vehicle's collision or emergency stop.

Then, the winding drum 60 continues turning, and thus, as shown in FIG. 6C, the bridging rod 65 of the winding drum 60 comes into contact with the seat belt 54. Thereafter, the bridging rod 65 presses the seat belt 54 downward. Thereby, the seat belt 54 becomes a V-shape between the peripheral surface of the winding drum 60 and a bridging roller 35. Thus, as shown in FIG. 6D, its part which is pulled out toward the side of the player P is pulled back.

After the seat belt 54 is pulled back in this way, the player P who is seated in the seat unit 13 is fastened onto the seat back 133 by the seat belt 54 which has once been slackened. At this time, the seat belt 54's tension allows the player P to feel an impact which is applied when the vehicle crashes into an outside object. In other words, the seat belt 54 is simply fastened tight, not from an ordinary state, but after the strength at which the player P is fixed has once been slightly eased. This allows the player P to feel an impact effectively.

Figure 7:
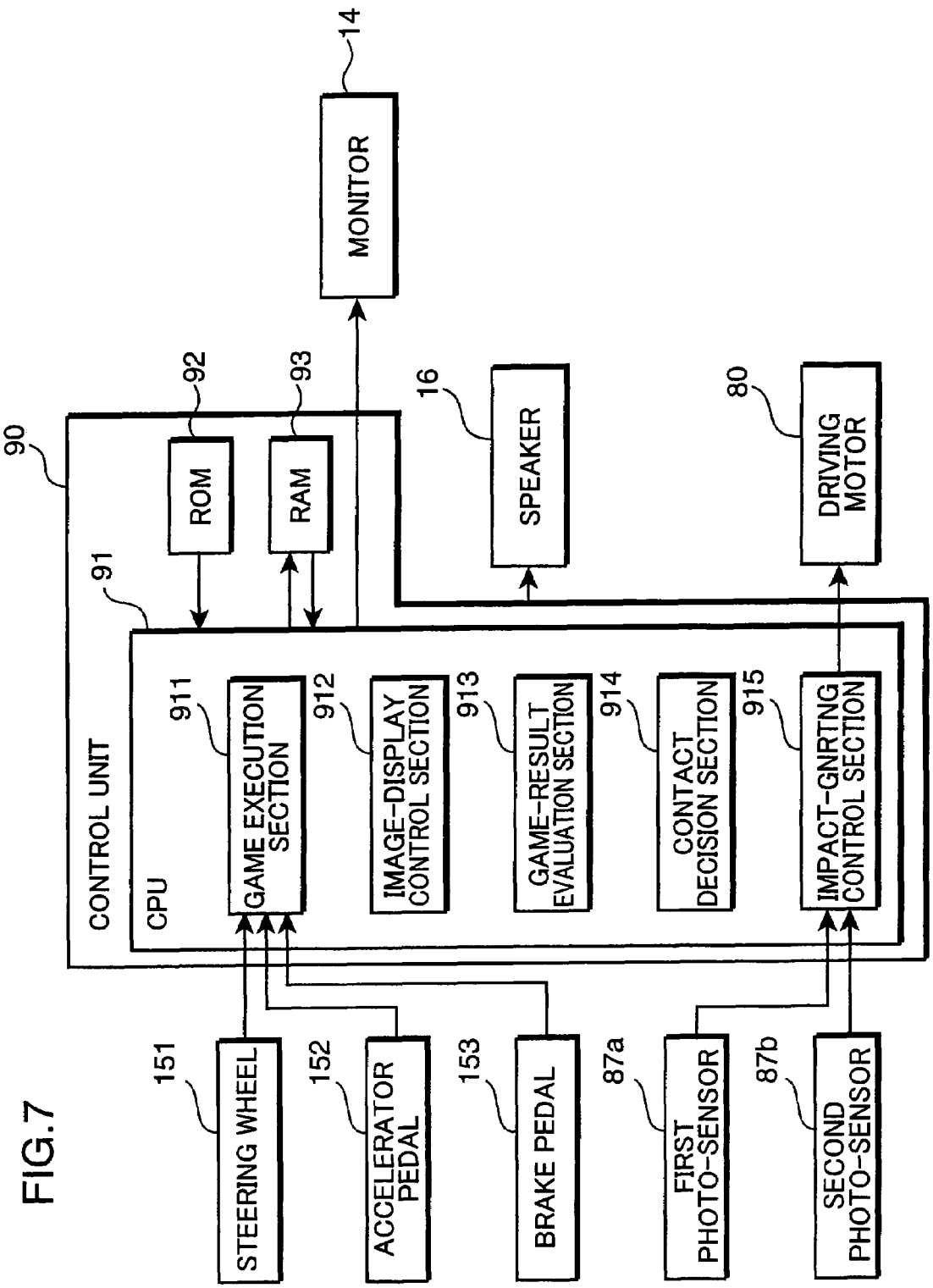
FIG. 7 is a block diagram, showing the control of the driving-game machine according to an embodiment of the present invention.

FIG. 7 is a block diagram, showing an example of the control of a driving-game machine. In FIG. 7, the driving-game machine 10 includes a control unit 90 which controls the overall operation of the driving-game machine 10. This control unit 90 is provided with: a control section 91 which is made up of a microcomputer and the like; an ROM 92 which stores game-program data, necessary game-image data, audio data such as a sound effect, or the like; and an RAM 93 which temporarily stores data whose processing is under way.

A game execution section 911 accepts, in real time, an operation signal according to the player P's operation for the steering wheel 151, the accelerator pedal 152 and the brake pedal 153. Then, it proceeds with a driving game by processing the contents which it has accepted according to a game program which is stored in the ROM 92.

An image-display control section 912 develops, for example, game images one after another in which the player P's eyesight is imitatively replaced with a camera's view, in the monitor 14 according to the game's progress. The image-display control section 912 includes an image processing section 912 and a display RAM. It reads required image data in imitative-camera view, from each of objects made up of a plurality of polygons and their corresponding textures (e.g., an image of the front part of a player's vehicle (or the player P's vehicle), various other vehicle objects (e.g., an ordinary vehicle by computer control, or another player's vehicle in a race), a surrounding or background-image object such as a driving-road object, a side wall and a building object, or the like) which is stored in the ROM 92. Then, it develops (or maps) it in a three-dimensional game space, and transforms it into a two-dimensional image and writes it in the display RAM. In this way, the coordinate calculations and the writing of processing results in the display RAM are repeatedly executed.

A game-result evaluation section 913 executes a predetermined evaluation for the player P's game performance, based on whether or not the self-vehicle has run and arrived at a destination, how long it has taken since it started (or ranking or the like if it competes with several other vehicles), or the like in the processing of the game execution section 911. Then, it allows the monitor 14 to display it.

A contact decision section 914 decides whether or not the self-vehicle object has bumped into another vehicle object, a side wall or the like (i.e., the crash object). Specifically, for example, it calculates and decides whether or not the polygon coordinate which configures the self-vehicle has come close to the polygon coordinate which configures another vehicle object or a side-wall object, up to a position a predetermined distance away from it or a closer position in which the former is expected to come into contact with the latter. Or, it decides, using an inner-product processing or the like, whether or not there is another object polygon inside of the self-vehicle object.

The contact decision section 914 repeats the contact decision processing according to the elapse of time. Thereby, if necessary, it can decide how strongly the former has come into contact with the latter, according to the following types of contact. Based upon the speed of such contact (i.e., how fast the former has come close to the latter), in order of the greatness of such an approaching speed, for example, there are a violent crash, an ordinary bump (e.g., a case in which the self-vehicle runs into another vehicle), and mere contact, In addition, the contact decision section 914 can also decide how hard such contact has been made, using the contact angle (e.g., head-on and at an oblique angle). In this embodiment, it decides on one type of contact, specifically, whether or not there is contact (or a crash). If the contact decision section 914 decides there has been contact, it outputs an impact instruction to an impact-giving control section 915.

Immediately after the impact-giving control section 915 has received the impact instruction, it outputs a drive signal for impact generation to the driving motor 80. Thereby, it allows the driving motor 80 to rotate from the initial angular position P0 shown in FIG. 6A through the middle angular position P1 shown in FIG. 6B to the belt pulling-back angular position P3 shown in FIG. 6D. Then, it is shortly rotated reversely, and thus, the initial position also returns. Specifically, until the winding drum 60 reaches the middle angular position P1 beyond the initial angular position P0, the seat belt 54 is held between the pressing roller 72 and the free rollers 63 so that it can freely move back and forth. Sequentially, the winding drum 60 rotates by a predetermined angle and reaches the belt pulling-back angular position P3. Through this rotation, it is pulled out by the frictional force of the sheet member 66 and once comes into a relief state. Thereafter, the winding drum 60 reaches the belt pulling-back angular position P3, so that it is pulled in and strained by the bridging rod 65. This applies a tension to the player P. This strain is given (i.e., the seat belt 54 is pressed by the bridging rod 65) for a moment, for example, approximately 0.1 to 1.0 second, or 2.0 seconds.

Then, the fact that the winding drum 60 has reached the belt pulling-back angular position P3 is detected by the photo-sensor 87b. Then, the impact-giving control section 915 rotates the driving motor 80 reversely, so that the strain state is relieved or slackened. Finally, the photo-sensor 87a is turned on, and thereby the drive of the driving motor 80 of the winding drum 60 comes to a stop. Herein, an aspect in which several contact-strength levels are set can be realized by setting various rotational angles and speeds for the driving motor 80.

As described in detail so far, the impact simulation apparatus according to the present invention is configured so that the player P can feel an impact simulation according to a predetermined condition (i.e., in the above described embodiment, the condition that the vehicle which the player P is virtually driving crashes into a virtual outside object in the monitor 14) which appears when playing a game while it is in execution. It is configured by: the seat belt 54 which is attached as the body fixing member to the player P; a winding drum 60 which gives an impact to the player P by straining the seat belt 54; an impact simulation giving portion which includes the belt pressing member 70, the driving motor 80 and the like; the control unit 90 which outputs, to the driving motor 80, a control signal for giving an impact when a vehicle bumps on the predetermined condition. Therefore, while the player P is executing a driving game in the driving-game machine 10, when the vehicle which the player P is driving smashes into an outside object such as another vehicle or a side wall, the seat belt 54 is strained based on a control signal from the control unit 90. This strain of the seat belt 54 which fastens the player P's chest tight allows the play P to feel an impact simulation. As a result, the driving game becomes attractive with so much presence.

In addition, the impact simulation apparatus 20 is simply configured so that the body fixing member (i.e., the seat belt 54 according to this embodiment) which the player P wears or grasps is strained. Therefore, for example, in order to give an impact, there is no need to move the seat unit 13 in which the player P is seated, on a large scale, together with the player P. This cuts down costs for such an apparatus and certainly gives an impact to the player P. Hence, this is effective in the reduction of the costs of the apparatus.

Furthermore, according to the above described embodiment, the impact simulation apparatus 20 slackens the seat belt 54 once and then strains it. In other words, after an easing state has once been given to the player P, a tension state emerges. Therefore, an impact-giving effect on the player P can be equivalent to a real collision (i.e., if a collision really takes place, the moment it has happened, an inertial force once moves the player P's body forward, and thereafter, the seat belt 54 gives it a rearward force).

Moreover, the impact simulation apparatus 20 is configure by: the belt winding-up unit 50 which winds up the seat belt 54 between a maximum pulling-out length and a minimum pulling-out length by the force of the spiral spring 55; the winding drum 60 onto which the seat belt 54 that is pulled out of this belt winding-up unit 50 is wound at a predetermined central angle; and the driving motor 80 which rotates this winding drum 60 around the drum center. The winding drum 60 includes the protruding arms 64 which are united with it and protrude outward from the peripheral surface so that they stride over the seat belt 54. They can turn between the initial angular position P0 and the belt pulling-back angular position P3. The protruding arm 64 (or its bridging rod 65) is provided in a position where after the winding drum 60 turns by a predetermined angle from the initial angular position P0 in the direction where the seat belt 54 is pulled out, it pulls back the seat belt 54, winds it onto the winding drum 60 and reaches the belt pulling-back angular position P3. Therefore, such an operation can be extremely naturally executed, compared with the case where an operation, in which the seat belt 54 is once slackened and then instantly strained by only the rotation in one and the same direction of the driving motor 80, is executed by changing the rotational direction of the driving motor 80. This helps make the generation of an impact by a collision more real.

The present invention is not limited to the above described embodiment, and thus, it also includes the following contents.

Figure 8A:
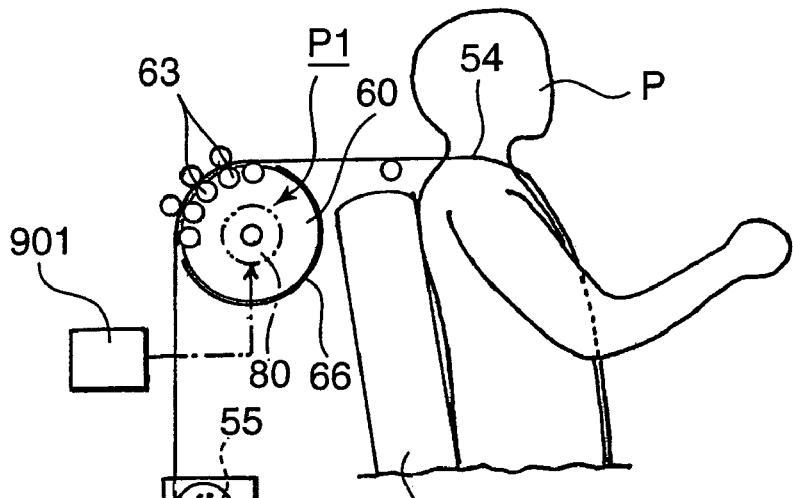
FIGS. 8A to 8C are each a side view of an impact simulation apparatus according to a second embodiment of the present invention.
Figure 8B:
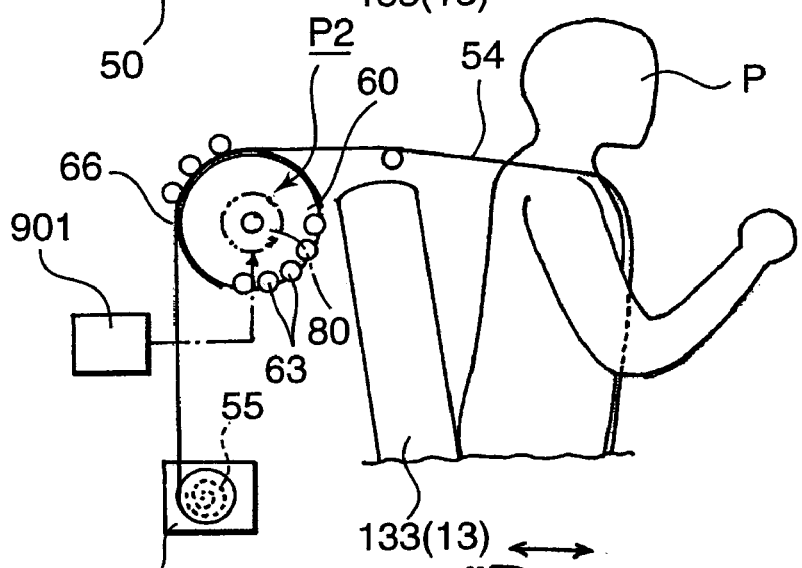
Figure 8C:
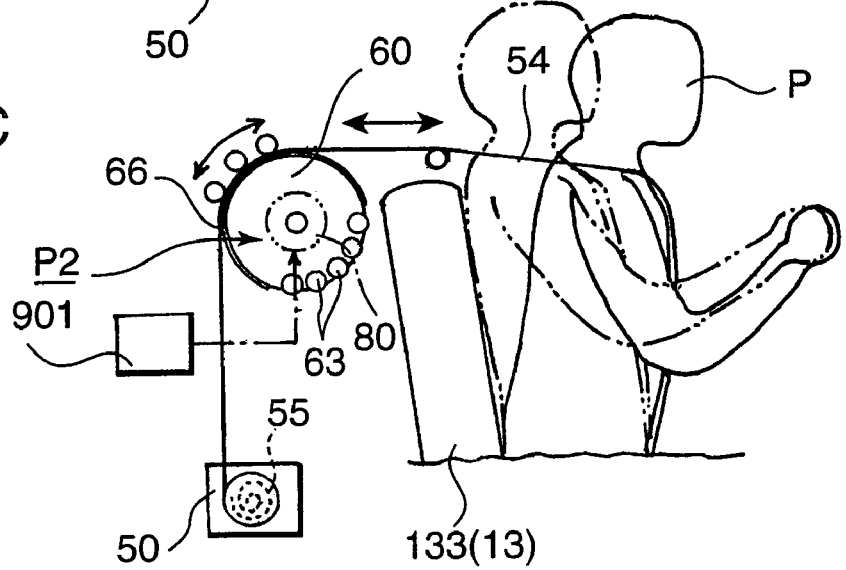

(1) FIGS. 8A to 8C are each a side view of an impact simulation apparatus 201 according to a second embodiment of the present invention. FIG. 8A shows a state in which the seat belt 54 is attached to the player P in an ordinary-stretch state by the force of the spiral spring 55 of the belt winding-up unit 50. FIG. 8B shows a state in which the seat belt 54 is pulled out of the belt winding-up unit 50 against the force of the spiral spring 55 by the clockwise drive of the driving motor 80. FIG. 8C shows a state in which the seat belt 54 is repeatedly strained and eased by the forward-reverse drive of the driving motor 80.

As shown in FIG. 8A to 8C, the impact simulation apparatus 201 according to the second embodiment includes, in the same way as the first embodiment: the belt winding-up unit 50; the winding drum 60; the driving motor 80 which drives the winding drum 60; and a control unit 901 which outputs a drive signal to this driving motor 80. In this respect, it is similar to the impact simulation apparatus 201 according to the first embodiment. However, it is different from that according to the first embodiment, in the fact that the winding drum 60 does not include the protruding arms 64 and the bridging rod 65, and the control unit 901 executes impact simulation control.

Specifically, using the control unit 901, when the vehicle which the player P is virtually driving is in ordinary motion in the monitor 14, as shown in FIG. 8A, the winding drum 60 is set at the initial angular position P1. The seat belt 54 keeps the player P held on the seat back 133 by the force of the spiral spring 55. If the player P changes the posture, the free rollers 63 are rotated, which leads it to move forward and reversely. In this respect, it is the same as the first embodiment.

When the vehicle that the player P is virtually driving runs into and outside object in the monitor 14, based on a drive signal from the control unit 901, the driving motor 80 is driven. Thereby, the winding drum 60 turns clockwise to reach the belt pulling-back angular position P2 (see FIG. 8B). Thereby, in the same way as the first embodiment, the seat belt 54 is once pulled out against the force of the spiral spring 55 by the frictional force of the sheet member 66.

In contrast, after the winding drum 60 has reached the belt pulling-back angular position P2, based on a drive signal from the control unit 901, the driving motor 80 is momentarily driven forward and reversely. This instantaneous forward-and-reverse rotation of the winding drum 60 causes the seat belt 54 to make a reciprocating rocking motion. Thereby, the player P is shaken back and forth by the seat belt 54.

In the impact simulation apparatus 201 according to the second embodiment, when the vehicle which is virtually driven in the driving-game machine 10 crashes into an outside object, the seat belt 54 fastens tight or relieves the player P intermittently. This makes the driving game more attractive.

Figure 9A:
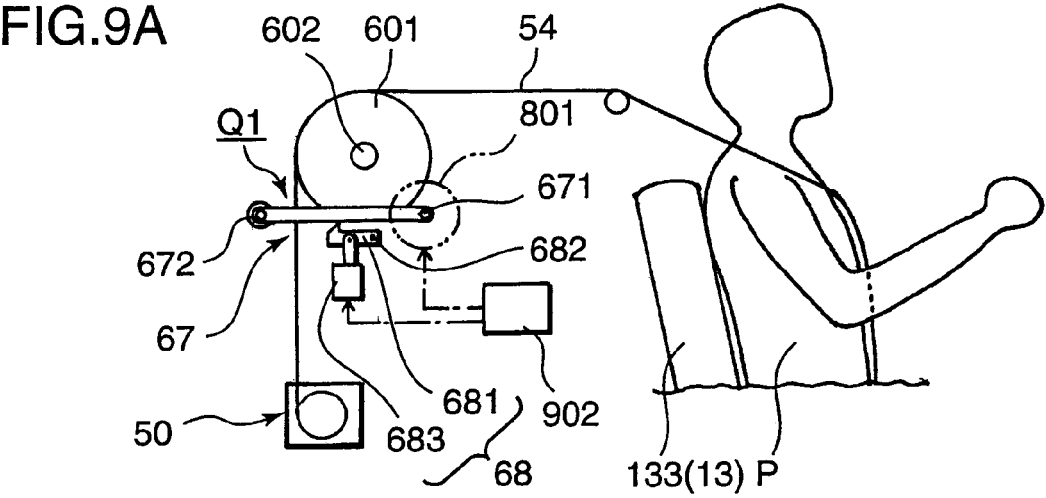
FIGS. 9A to 9C are each a side view of an impact simulation apparatus according to a third embodiment of the present invention.
Figure 9B:
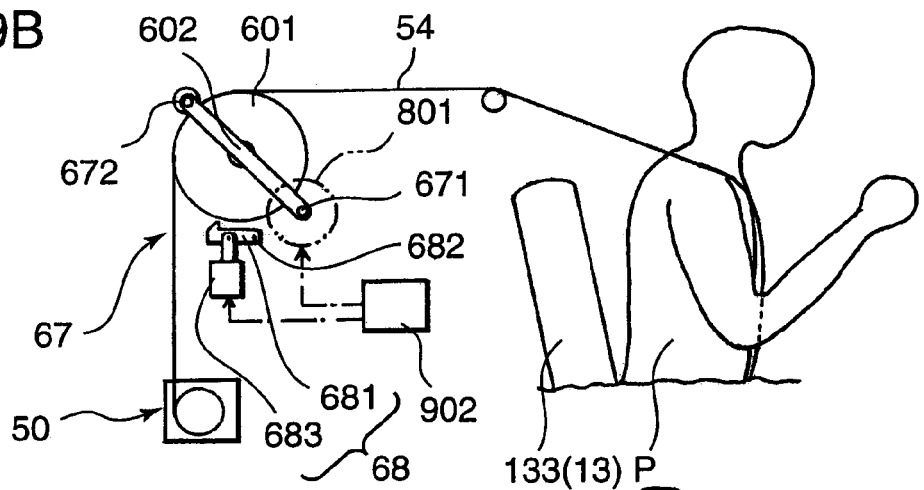
Figure 9C:
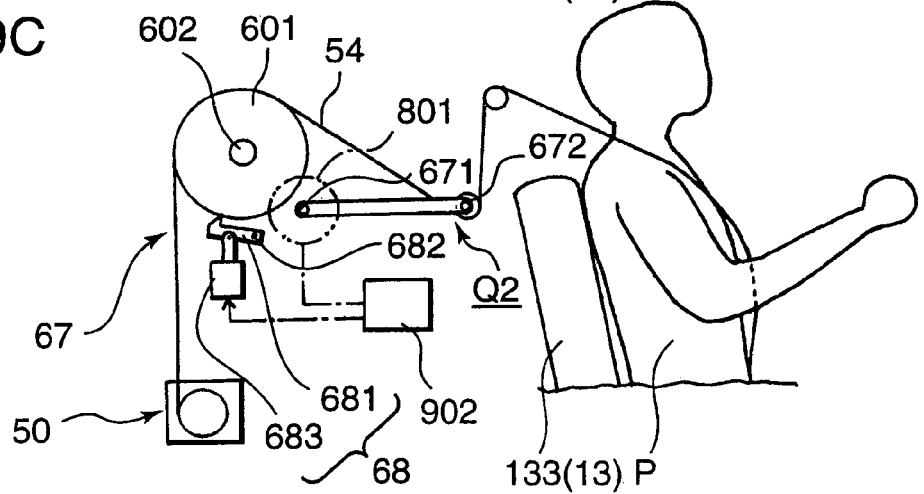

(2) FIGS. 9A to 9C are each a side view of an impact simulation apparatus 202 according to a third embodiment of the present invention. FIG. 9A shows a state in which the seat belt 54 is attached to the player P in an ordinary-stretch state by the force of the spiral spring 55 of the belt winding-up unit 50. FIG. 9B shows a state in which the seat belt 54 is pulled out of the belt winding-up unit 50 against the force of the spiral spring 55 by the clockwise drive of a driving motor 801. FIG. 9C shows a state in which the seat belt 54 is strained by the drive of the driving motor 801.

As shown in FIGS. 9A to 9C, the impact simulation apparatus 202 according to the third embodiment includes: a winding drum 601 which is not provided with the free rollers 63 according to the first embodiment; the belt winding-up unit 50 similar to that of the first embodiment of which the seat belt 54 is pulled out; a turn lever 67 which gives a strain state to the seat belt 54; the driving motor 801 which rotates this turn lever 67; and a braking member 68 which hooks or unhooks the winding drum 601 so that the winding drum 601 can be permitted to rotate or stopped from rotating.

The winding drum 60 is supported concentrically on a central shaft 612 so as to rotate around it. Thereby, ordinarily, as shown in FIG. 9A, it rotates forward and reversely around the central shaft 612, according to the variation in the length by which the seat belt 54 is pulled out of the belt winding-up unit 50 by the player P's posture change or the like.

As the turn lever 67, a pair is provided so that the winding drum 601 is located between them. They are supported on a drive shaft 671 which is provided ahead of (in FIG. 9, rightward from) and below the winding drum 601 and behind the seat back 133, and which extends in the width directions (i.e., in the perpendicular directions to the paper surface of FIG. 9), so that they can be turned around it. The turn lever 67 is turned forward and reversely around the drive shaft 671. Thereby, its posture can be shifted from an initial posture Q1 (see FIG. 9A) in which it extends rearward to a pressing posture Q2 (see FIG. 9C) in which it extends forward so as to press the seat belt 54 down, and vice versa.

A bridging rod 672 is provided between the tips of the pair of turn levers 67. This bridging rod 672 and the drive shaft 671 are each designed to be a little linger than the diameter of the winding drum 601. Thereby, when the turn lever 67 is inclined rearward at approximately 45 degrees with respect to the horizontal surface, the bridging rod 672 is in contact, via the seat belt 54, with the peripheral surface of the winding drum 601.

The above described braking member 68 is made up of: a hooked member 681 which is supported to a shaft 682 so as to turn around it; and an actuator 683 which is formed by a solenoid or the like and that turns this hooked member 681 forward and reversely around the shaft 682. By the actuator 683's forward drive, the hooked member 681 is turned clockwise around the shaft 682. Thereby, the tip of the hooked member 681 presses the peripheral surface of the winding drum 601, so that a brake is put on the rotation of the winding drum 601. On the other hand, by the actuator 683's reverse drive, the tip of the hooked member 681 gets out of contact with the peripheral surface of the winding drum 601, so that the winding drum 601 can rotate around a drum shaft 602.

In the impact simulation apparatus 202 configured in this way, in the state shown in FIG. 9A, when the vehicle that the player P is virtually driving runs into an outside object in the monitor 14 (see FIG. 1), a control signal from a control unit 902 is outputted to the driving motor 801. Thereby, the driving motor 801's forward drive allows the turn lever 67 to turn clockwise around the drive shaft 671. Then, as shown in FIG. 9B, the turn lever 67 is inclined at approximately 45 degrees, so that the seat belt 54 is sandwiched between the bridging rod 672 and the winding drum 601. Thereby, following the turn of the turn lever 67, it is pulled out of the belt winding-up unit 50. As a result, the player P is temporarily released from the strain state.

In this state, the control unit 902 outputs a control signal to the actuator 683. Then, the actuator 683 is driven so that the hooked member 681 presses and comes into contact with the peripheral surface of the winding drum 601. Thereby, the winding drum 601 is stopped from rotating.

Then, in the state where the winding drum 601 is kept restrained from rotating, the turn lever 67 continues turning. Thereby, as shown in FIG. 9C, the bridging rod 672 presses the seat belt 54 downward from above, so that the seat belt 54 is pulled back into a strain state. This strain state allows the player P who is seated in the seat unit 13 to feel an impact simulation when the player P's vehicle bumps into an outside object in the monitor 14.

In the impact simulation apparatus 202 according to the third embodiment, the turn lever 67 which gives a strain to the seat belt 54 operates independently from the rotation of the winding drum 601. Thereby, the turn lever 67 can be operated, regardless of the rotation of the winding drum 601. Therefore, the strain state of the seat belt 54 can be varied according to the situation. This makes it possible to use the impact simulation apparatus 202 for wider purposes.

(3) In the above described embodiments, the driving-game machine 10 is adopted as the game machine according to the present invention. However, the present invention is not limited to the driving-game machine 10 as the game machine. It can also be applied to a fishing game machine in which so-called sports fishing is simulated, such as catching a large fish such as a spearfish. In that case, the player P sits down on a chair for fishing in front of monitor 14. Then, the player P's body is fixed on the chair by a rope as the long object member. In this state, the player P extends a dummy fishing rod toward the water surface which is displayed in the monitor 14. Then, if a catch is hooked, the tightness at which the player P is fastened by the rope is changed. Thereby, with feeling for such an impact, the player P can really feel that the catch has taken the hook. This makes a fishing game extremely attractive.

(4) In addition, the game machine according to the present invention can also be used as a so-called space game machine in which the player P boards a spacecraft and embarks into space. In that case, the player P sits down in a simulated pilot seat of the spacecraft. Then, the player P's body is fixed on the simulated pilot seat by a seat belt as the long object member. In this state, the player P pilots the spacecraft imitatively while watching the monitor 14. The strength at which the player P is fastened by the seat belt is designed to be varied according to the situation (e.g., if a meteorite crashes into the spacecraft, if the spacecraft is bombarded with a laser-beam shell from the enemy in a space war, or in another such case). Thereby, with application of the simulation for such an impact, the player P can feel that the meteorite has crashed or another such incident. This makes a space game more attractive.

(5) In addition, the game machine according to the present invention can also be applied to a pet-animal walk game in which the player P takes and imitative pet along for a stroll in a screen. In that case, a body tying member corresponds to the body fixing member, and the body tying member may be a rope which the player P grasps to keep the imitative pet on a leash. Then, the rope is extended toward the player P via the impact simulation apparatus 20 from the lower part of the case body of the game machine provided with the monitor 14, as if it were ties to a virtual rope on the screen displayed in the monitor 14. Thereby, the player P who holds the rope can really feel that the player P is taking the pet animal out for a walk. Besides, when the dummy pet runs wild, the control unit 90 outputs a control signal for giving an impact to the impact simulation apparatus 20. According to such a configuration, when the pet animal on the screen runs roughly, in line with its move, the rop is once slackened off and then strained. This impact allows the player P to feel the pet's abrupt run.

(6) As the game machine according to the present invention, an ordinary fishing game can also be mentioned in which the player P fishes in a simulated water area in the monitor 14. In that case, the body tying member may be a line which is attached via a fishing rod to the player P. Then, the fishing line attached to the tip of a real fishing rod is extended toward the player P via the impact simulation apparatus 20 from the lower part of the case body of the game machine provided with the monitor 14, as if it were tied to a virtual line on the screen displayed in the monitor 14. Thereby, the player P who holds the fishing rod can really feel such fishing while watching the screen. Besides, when a fish swallows a fishhook, the control unit 90 outputs a control signal for giving an impact to the impact simulation apparatus 20. According to such configuration, when a fish is hooked on the screen, in line with its move, the line is once slackened off and then strained. This impact allows the player P to feel that the fish has been hooked.

In sum, a game-machine impact simulation apparatus according to a first aspect of the present invention, which allows a player to feel a predetermined impact simulation according to a game situation, comprising: a body fixing member which fixes the body of the player; and an impact generating unit which gives a momentary change in the strength at which the body is fixed by the body fixing member.

According to this configuration, the player who is playing a game and is fixed by the body fixing member receives force via the body fixing member from the impact generating unit. This force is the one which gives a momentary change in the player's fixing strength according to the game's situation. Thereby, the player can feel the impact which corresponds to a game situation.

According to the first aspect of the present invention, a player can feel the impact which corresponds to a game situation. Hence, the game becomes more attractive, as if the player were experiencing its situation in real life.

According to a second aspect of the present invention, in the game-machine impact simulation apparatus according to the first aspect: a game machine is provided with a body fixing portion which receives the body of the player that is fixed by the body fixing member; the body fixing member is a long object member which fixes the body of the player on the body fixing portion; and the impact generating unit (50, 60, 70, 80) gives a momentary change in the fixing strength by varying the state of the long object member (54).

According to this configuration, the player is fixed on the body fixing portion by the long object member, and in this state, the length of the long object member's part which fixes the player's body is varied by the impact generating unit. This produces a momentary change in the long object member's body-fixing strength. Then, this momentary change in the fixing strength allows the player to feel an impact according to the game situation, as if the player were experiencing it. Therefore, the game offers the illusion that the player is in face of the scene, and thus, it becomes extremely attractive. In addition, it is the long object member that fixes the player's body. If the long object member is simply fastened or released, the fixing strength can be changed, thus making such a fixing member a relatively simple structure.

According to the second aspect of the present invention, it is the long object member that fixes the player's body. If the long object member is fastened or released, the fixing strength can be changed, thus making such a fixing member a relatively simple structure.

Note that said body fixing member includes a simulated seat belt 54 for a vehicle and said variation of the state of the long object member includes changing a length of the seat belt that extends from a start point which the belt is drawn out to a fix point at which free end of the seat belt is fixed.

In addition, said variation of the state of the long object member includes changing in a path along which the seat belt (54) extends from the start point to the fix point.

According to a third aspect of the present invention, in the game-machine impact simulation apparatus according to the second aspect: the body fixing portion is a seat unit on which the player sits down; and the long object member is an imitation of a seat belt for a vehicle which is fastened onto the upper-half body of the player who sits down in the seat unit.

According to this configuration, the player sits down in the seat unit and fastens the long object member onto the upper half of the body. Thereby, the player comes into a state where a simulated vehicle driving can be executed (i.e., a state where a so-called driving game can be played). Then, according to the game situation, the impact generating unit momentarily gives a change in the strength at which the seat belt keeps the player fastened. This momentary change in the seat-belt fastening strength allows the player in wearing the seat belt to feel the impact simulation. Therefore, the driving game offers the illusion that the player is in face of the scene, and thus, it becomes attractive. In addition, in real life, a seat belt is indispensable for a vehicle. Hence, according to the second aspect, especially without adding a special structure which does not exist in real life, an impact can be generated using the form of a seat belt as it is. This makes it possible for a player to concentrate on a game without feeling something wrong, and thus to feel it with more presence.

According to the third aspect of the present invention, the player who sits down in the seat unit and fastens the long object member can feel a situation at the time when the player has bumped into an obstacle while driving, or the like. This allows the game to have a lot of presence and become extremely attractive.

According to a fourth aspect of the present invention, in the game-machine impact simulation apparatus according to the third aspect: the impact generating unit includes a winding-up unit which has a bias member that forces the long object member to be wound up in the direction where the player is fastened tight, a winding unit which is provided between the winding-up unit and the position where the player is fastened and which has a drum on which the long object member is wound at a part thereof in the circumferential-surface direction, and a driving source which rotates the drum; the winding unit is in a release state in a positional range between an initial position and a first position of the drum where the long object member is freely let out to, and wound up from, the position in which the player is fastened, and has a mechanical unit which rotates the drum and simultaneously lets out the long object member within the rotational angle from the first position to a predetermined angular position in the belt force decreasing direction, and an arm which is attached to the drum so as to rotate together and spans the long object member that is wound on the drum; and the arm winds in the long object member in the circumferential directions of the drum, within the rotational angle from the middle angular position between the first position of the drum and the predetermined angular position to the predetermined angular position.

According to this configuration, when the drum is in an angular range between an initial position and the first position, the long object member (i.e., seat belt) is in the release state. Hence, according to the player's build or a change in the player's posture in the seat unit, the seat belt comes out of, or goes into, the winding-up unit. Then, it is attached to the player by a predetermined fastening force of the bias member. In this state, if a dummy vehicle which the player is driving comes into contact with or bumps into a crash object, or comes to a sudden stop, then the driving source is driven. Thereby, the drum is rotated from the reference angle to the predetermined angular position in the belt force decreasing direction. At this time, the mechanical unit works so that the seat belt is pulled out of the winding-up unit together with the drum's rotation. This allows the player to feel a relief state on his body. On the other hand, the drum begins to rotate, and thereafter, it reaches the middle angular position. From this position, the arm which rotates together with the drum winds in the seat belt in the circumferential directions of the drum. Thereby, the seat belt's fastening force works on the player, so that the player can feel a tension. In addition, using the drum's rotational speed, the seat belt's fastening strength is swiftly shifted. This helps give the player an effective impact feeling.

According to the fourth aspect of the present invention, using the drum's rotational speed, a shift is swiftly made from relief to tension, and vice versa. This helps give the player an effective impact feeling.

According to a fifth aspect of the present invention, in the game-machine impact simulation apparatus according to the fourth aspect, the mechanical unit is provided with: a pressing roller which rotates freely and presses the periphery of the drum via the long object member; and a friction member which is disposed on the periphery of the drum and comes into contact from a predetermined position with the long object member as the drum rotates, so that the friction member, together with the pressing roller, fixes the relative position of the long object member to the drum.

According to this configuration, the long object member (or seat belt) is pressed toward the friction member by the pressing roller. In this state, its relative position to the drum is fixed by the frictional force between it and the friction member. Thereby, as the drum rotates, it is pulled out of the winding-up unit and sent out in the direction where the player is fastened.

As described above, the friction member is provided in the peripheral part of the drum, and in addition, the pressing roller is provided which presses the long object member between the friction member and itself. Therefore, using such a simple structure, the long object member can be certainly moved.

According to the fifth aspect of the present invention, the friction member is provided in the peripheral part of the drum, and in addition, the pressing roller is provided which presses the long object member between the friction member and itself. Therefore, using such a simple structure, the long object member can be certainly moved.

According to a sixth aspect of the present invention, in the game-machine impact simulation apparatus according to the fifth aspect, a free roller is provided at a place except the friction member on the periphery of the drum, so that the long object member freely makes a relative motion to the drum.

According to this configuration, in the first position when the drum in the angular range between the period of time when the drum begins to rotate (initial angular position) and the first angular position, even if a winding drum rotates, that is absorbed into the free roller's rotation. Thereby, the long object member is prevented from being pulled out of the winding-up unit. Hence, in a state where no impact is supposed to be applied, even if the player changes the posture, the long object member (or seat belt) moves in line with the player's body motion. Therefore, an unnecessary burden cannot be imposed on the player.

According to the sixth aspect of the present invention, in a state where the drum is ordinarily not supposed to rotate, if the free roller in contact with the long object member is rotated, then according to the player's build or posture, the long object member can be freely pulled out of the winding-up unit. Hence, regardless of the player's figure, the long object member can come into close contact with the player who is seated, even though its length is especially not adjusted. This helps shorten the period of time when the player prepares for a game. In addition, even if the player changes the posture in a situation where an impact is not supposed to be applied, the long object member (or seat belt) moves in line with the player's body motion. Therefore, while playing a game, the player can freely change the player's posture in the seat unit.

A game machine according to a seventh aspect of the present invention, comprising: a monitor which displays a game image in front of a seat; a controller which accepts an operation from a player; and a game control means which runs and controls a player's vehicle within a virtual game space according to an operational situation that is accepted by the controller, wherein the game control means decides whether the player's vehicle has come into virtual contact with a crash object or the player's vehicle has come to a sudden stop, and if this decision is acknowledged as positive, outputs an impact generation instruction to the impact generating unit of the game-machine impact simulation apparatus defined in any one of claims 4 to 6, provided in the following section.

According to this configuration, when the player is viewing a game image which is displayed in the monitor and is playing the game within a virtual game space via the controller in a virtual driving operation, the player's vehicle stops short so as to escape from virtual contact (including a bump) with a crash object, or a crash against the crash object. At this time, an impact generation instruction is outputted to the impact simulation apparatus. Thereby, an impact is given via the long object member to the player.

According to the seventh aspect of the present invention, on a screen, the player can view the player's vehicle's contact including a bump with another vehicle, a side wall or another crash object. At the same time, the player can receive an impact via the long object member which is imitative of a seat belt. This helps make a driving game rich in presence.

A game machine according to an eighth aspect of the present invention, comprising the game-machine impact simulation apparatus defined in any one of claims 1 to 6, provided in the following section.

According to this configuration, whatever kind of game machine is used, the player can feel an impact on his body with much presence in line with a game.

According to the eighth aspect of the present invention, whatever type of game machine is used, the player can feel an impact on his body with much presence in line with a game.

This application is based on Japanese patent application Ser. No. 2004-209607, filed in the Japan Patent Office on Jul. 16, 2004, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An impact simulation device for a game machine, comprising:
   a seat upon which a player sits;
   a belt applying a belt force to said player so as to urge the player into the seat;
   an impact generating unit configured to change the belt force such as to simulate an impact, said impact generating unit including:
   a winding-up unit which winds the belt and has a bias member that biases the belt to be wound up in a direction applying the belt force to the player;

a winding unit provided along a path of said belt between the winding-up unit and a position where the player is fastened, said winding unit including a drum having a circumferential surface portion onto which the belt is wound;

the winding unit being configured such that;
said drum is rotated in a first direction from an initial position P0, in order through angular positions P1 and P2, to angular position P3,
said winding unit is set in a release state when the angular position of said drum is in a range up to the first position P1 from the initial position P0 wherein the is freely let out, and wound up from, the position in which the player is fastened, and said winding unit includes:
a mechanical unit which rotates the drum expelling out the belt toward the player with rotation of the drum in the first direction within the angular range from said first position P1 to the position P3; and
an arm attached to the drum so as to rotate together with said drum and rotate across the path of said belt at a position between said drum and said player when said drum being in the angular range beginning from a middle point P2, between said first position P1 and the predetermined angular position P3, to the predetermined angular position P3, and engage said belt so as to retract said belt in a direction to increase the belt force applied to the player.

2. The impact simulation device according to claim 1, wherein the mechanical unit is provided with:
a pressing roller which rotates freely and presses the belt against a periphery of the drum; and
a friction member disposed along a periphery of the drum of said circumferential surface portion and comes into contact from a predetermined position with the belt as the drum rotates from the position P1 to the position P3, so that the friction member, together with the pressing roller, fixes the relative position of the belt to the drum.

3. The impact simulation device according to claim 2, wherein a free roller is provided at a position on said circumferential surface portion of the drum whereat the friction member is not disposed on the periphery of the drum and which contacts the belt when the drum is at the initial position, so that the belt is free to move relative to the drum.

4. A game machine, comprising:
a seat for a player;
a monitor which displays a game image in front of the seat;
a controller which accepts operations from the player;
an impact simulation device; and a game control means which runs and controls virtual game vehicle within a virtual game space according to the operations accepted by the controller, the game control means being configured to determine whether the virtual game vehicle has come into virtual contact with a crash object or the virtual game vehicle has come to a sudden stop, and if the result of said determination is affirmative, outputs an impact generation instruction to the impact simulation device, said impact simulation device comprising:
a belt applying a belt force to a body of the player on the seat so as to urge the player into the seat; and
an impact generating unit configured to effect a momentary change in the belt force, said impact generating unit including:
a winding-up unit which winds the belt and has a bias member that biases the belt to be wound up in a direction applying the belt force to the player;

a winding unit provided along a path of said belt between the winding-up unit and a position where the player is fastened, said winding unit including a drum having a circumferential surface portion onto which the belt is wound;

the winding unit being configured such that:
said drum is rotated in a first direction from an initial position P0, in order through angular positions P1 and P2, to angular position P3,
said winding unit is set in a release state when the angular position of said drum is in a range up to the first position P1 from the initial position P0 wherein the is freely let out, and wound up from, the position in which the player is fastened, and said winding unit includes:
a mechanical unit which rotates the drum expelling out the belt toward the player with rotation of the drum in the first direction within the angular range from said first position P1 to the position P3; and
an arm attached to the drum so as to rotate together with said drum and rotate across the path of said belt at a position between said drum and said player when said drum being in the angular range beginning from a middle point P2, between said first position P1 and the predetermined angular position P3, to the predetermined angular position P3, and engage said belt so as to retract said belt in a direction to increase the belt force applied to the player.

5. An impact simulation apparatus for a game machine, comprising:
a seat unit on which a player sits down;
a seat belt for fastening over and applying a belt force on an upper body of the player who sits down in the seat unit;
an impact generating unit for giving a momentary change in the belt force, said impact generating unit including:
a winding-up unit for biasing the seat belt to be wound up in a direction that the belt force of the seat belt on the player is increased;
a winding unit, provided between the winding-up unit and where the player is fastened with the seat belt, said winding unit having:
a drum onto which the seat-belt is wound at a part thereof in the circumferential surface direction; and
an arm which extends radially outwardly from an outer circumference of the drum and rotates together with the drum, said arm being configured to come into contact with the seat-belt through rotation of the drum to a certain angular position of the drum so as to deflect the path of the seat belt in a direction out of line with the path prior to the contact so as to increase said belt force; and
a driving unit for rotating the drum.

6. The impact simulation apparatus according to claim 5, wherein:
said arm is provided with a bridging rod extending in a direction parallel to a rotational axis of the drum; and
said seat belt passes between the outer circumference of the drum and the bridging rod, and said bridging rod is configured to come into contact with the seat belt on a first side when the drum at said certain angular position such that a path along which the seat belt extends prior to the contact with said bridging rod is altered, wherein said first side is of the seat belt is opposite from a second side of the seat belt which is in contact with the outer circumference of the drum.

7. An impact simulation apparatus for a game machine, comprising:

a seat unit on which a player sits down;

a seat belt for fastening over and applying a belt force on an upper body of the player who sits down in the seat unit;

an impact generating unit for giving a momentary change in the belt force, said impact generating unit including:

a winding-up unit for biasing the seat belt to be wound up in a direction that the belt force of the seat belt on the player is increased;

a winding unit, provided between the winding-up unit and where the player is fastened with the seat belt, said winding unit having:

a drum having a circumferential surface portion onto which the seat belt is wound in the circumferential surface direction;

a turn lever provided proximate the drum such that the turn lever turns between a non-contacting position where the turn level makes no contact with the seat belt and a contacting position where the turn lever comes into contact with the seat-belt from a side opposite from a side of the seat belt facing the circumferential surface portion of the drum and deflects the path of the seat belt in a direction out of line with the path prior to the contact so as to increase said belt force; and a driving unit for rotating the turn lever between the non-contacting position and the contacting position.

* * * * *